United States Patent [19]

Cirkler et al.

[11] 4,291,947

[45] Sep. 29, 1981

[54] PROCESS FOR MAKING A LIQUID CRYSTAL CELL

[75] Inventors: Werner Cirkler, Ismaning; Hans Krüeger, Munich, both of Fed. Rep. of Germany

[73] Assignee: Siemens Aktiengesellschaft, Berlin & Munich, Fed. Rep. of Germany

[21] Appl. No.: 40,040

[22] Filed: May 17, 1979

[30] Foreign Application Priority Data

May 30, 1978 [DE] Fed. Rep. of Germany ....... 2823630

[51] Int. Cl.[3] .............................................. G02F 1/133
[52] U.S. Cl. ................................. 350/336; 350/334; 350/339 R
[58] Field of Search ........... 350/336, 341, 334, 339 R, 350/342

[56] References Cited

U.S. PATENT DOCUMENTS

| 3,932,026 | 1/1976 | Sprokel | 350/339 R |
| 3,966,305 | 6/1976 | Young | 350/341 |
| 4,140,372 | 2/1979 | Saurer | 350/336 |
| 4,150,876 | 4/1979 | Yevick | 350/360 X |

OTHER PUBLICATIONS

Sprokel: "Photodiode Controlled Storage Cells," IBM Technical Disclosure Bulletin, vol. 18, p. 1986, Nov. 1975.

*Primary Examiner*—Edward S. Bauer
*Attorney, Agent, or Firm*—Hill, Van Santen, Steadman, Chiara & Simpson

[57] ABSTRACT

A liquid crystal cell having a pair of carrier plates spaced apart to form a chamber for receiving a layer of liquid crystal material, each of the carrier plates having an electrical conductive coating or layer forming the electrodes on the surface facing the chamber with the surface of the electrodes being flush with the surface of an insulating material. The insulating material may be an additional layer of material disposed with the electrical conductive coating on the carrier plate or may be the carrier plate with the conductive coating being placed in recesses which have a depth equal to the thickness of the conductive coating. To form the recesses, a mask is applied to the surface of the carrier plate which is then etched, a conductive coating is applied on the remaining portions of the mask and in the recesses and then the mask is stripped with the coating thereon. When the coating and an insulating coating are applied on the carrier plate, a coating of electrical conductive material is applied on the surface of the carrier plate, a mask is applied, those portions of the coating which are not necessary to form the electrode structure are removed, a second coating of insulating material is applied in the areas where the electrical conductive coating was removed and then the mask is removed with the portion of the coating disposed thereon.

7 Claims, 2 Drawing Figures

PROCESS FOR MAKING A LIQUID CRYSTAL CELL

BACKGROUND OF THE INVENTION

1. Field of the Invention

The present invention is directed to a liquid crystal cell having a pair of carrier plates spaced apart to form a chamber for receiving a liquid crystal layer with each of the carrier plates supporting electrical conductive coating forming the electrodes for the cell.

2. The Prior Art

Various structures of liquid crystal cells are known. An example is disclosed in German Offenlegungsschrift No. 2,354,736, which is based on a United States patent application, which matured into U.S. Pat. No. 3,932,026.

Praxis has shown that many liquid crystal displays especially at the edge of their electrode segments have a relatively weak optical contrast, which also increasingly degenerates during the course of operation of the device. When the liquid crystal molecules of the layer are oriented by means of a layer obliquely sputtered on or by means of mechanical processing of the contact surface, these optical disorders are particularly noticeable. It is believed that the responsibility for these optical defects is the fact that there is a surface variation or jump at the boundary between the electrode and the surface of the substrate on the order of $10^{-1}$ $\mu$m. During an oblique vapor depositing, this step or variation in the surface level will cast a shadow and also leads to localized irregularities in a microstructure which was physically formed on the surface.

One has attempted to remove their discontinuity at the transitions with one or more coatings, an example is shown in German Offenlegungsschrift No. 2,533,705, which is based on a United States patent application, which matured into U.S. Pat. No. 3,966,305. However, a truly immaculate contrast can be achieved in this way only when one works with particular care and can accept relatively thick coatings.

SUMMARY OF THE INVENTION

The object of the present invention is to provide a liquid crystal cell whose optical qualities will satisfy even the highest demands and which cell can be easily fabricated. To accomplish these tasks, a liquid crystal cell having two carrier plates spaced apart to form a chamber for receiving the liquid crystal layer, each of the carrier plates being provided with transparent, electrically conducting coatings or layers to form electrodes on a surface facing the chamber, the electrodes being of a thickness to provide a surface which is flush with the surface of the adjacent insulating material in the area free of the electrode so that the edges of the electrodes are engaged by an insulating material and the discontinuities in the alignment of molecules of the liquid crystal layer at the boundaries between an electrode and the insulating material are minimized. In this display, the insulating body or material can be part of the carrier plate and in such an instance the electrodes are deposited in recesses formed in the carrier plate with each recess having a depth equal to the thickness of the conductive coating forming the electrode. However, the insulating material can also be provided as an additional layer of insulating material deposited on the surface of the substrate or carrier plate in those areas free of the conductive coating forming the electrode.

In the liquid crystal cell of the present invention, the surfaces of all of the electrodes on the carrier plate are augmented to be a continuous, planar total surface which itself can be faultlessly structured or, respectively, represents an ideal base for an obliquely sputtered orientation layer provided with a microprofile in another manner. The proposed electrode embedding, however, also produces a further advantage in that it extends the life expectancy of the display. In previous types of liquid crystal cell devices, one found again and again that the electrodes gradually eroded with the erosion starting at the marginal zones or edges of the electrodes. This decomposition process, which is based on electro-chemical reaction between the substrate material and the material of the conductive layers and are apparently favored by a strong field homogeneities at the electrode edge, occur only very slowly in the liquid crystal cell of the present invention.

The proposed displays can be manufactured in a very simple manner. For example, if the electrodes are to be formed in a recess of the carrier plate, then the carrier plate is provided with a negative photo resist which is then exposed and developed to form a mask which exposes portions of the surface of the carrier plate in which the electrode pattern is to be provided. Subsequently, the exposed portions are etched to the desired depth and a coating or layer of electrode conductive material to form electrodes is deposited in the recesses and on the remaining portions of the mask. Subsequently, after the layer has been deposited to a thickness equal to the depth of the recesses, the mask is removed with the portion of the coating disposed thereon.

To provide the carrier plates for the cell in which the coating and the insulating material are both layers disposed on the surface of the substrate or carrier plate, a layer of the conductive material is provided on the surface of the substrate. Then, a positive photo resist is disposed on the layer. The positive photo resist is exposed and developed to produce an etching mask having the desired pattern of the electrodes to be formed on the carrier plate. The conductive coating which is exposed by the etching mask is then removed by etching and a layer of the insulative material is then deposited to a layer thickness equal to the thickness of the conductive coating. The etching mask is then removed with the insulative material disposed thereon. In both instances, additional layers may be applied to the conductive coating and these additional layers may be structured to provide an orientation layer or be applied as an obliquely sputtered orienting coating.

DESCRIPTION OF THE PREFERRED EMBODIMENTS

Figure 1:
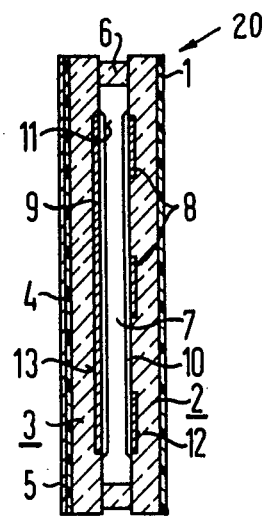
FIG. 1 is a cross section of a liquid crystal cell in accordance with one embodiment of the invention.
Figure 2:
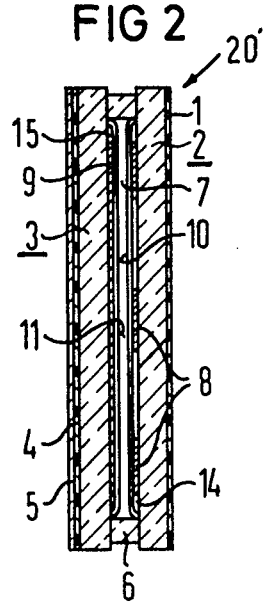
FIG. 2 is a cross section of a second embodiment of a liquid crystal cell in accordance with the present invention.

The principles of the present invention are particularly useful when incorporated in a liquid crystal display generally indicated at 20 in FIG. 1 and 20' in FIG. 2. In each of the figures, parts of the liquid crystal display, for example the electrical feed lines, which parts are not absolutely necessary for understanding the present invention, are omitted for the sake of simplicity.

The liquid crystal display or cell 20 is a so-called twisted nematic layer cell with a multi-place seven-segment numerical display. The cell 20 as taken in the direction of viewing, contains a front linear polarizer 1, a front carrier plate 2, a back carrier plate 3, a back linear polarizer 4, whose direction of polarization extends perpendicular to the direction of polarization of the polarizer 1, and a reflective layer or reflector 5. The two carrier plates 2 and 3 are connected to one another in a hermetically sealed fashion by a frame 6 to form a chamber 7 for receiving a liquid crystal layer.

The plates 2 and 3 are each provided with electrically conductive layer to form electrodes with the layer on the front plate 2 being segmented to form electrode segments 8 and the layer on the back plate being continuous to form a continuous back electrode 9. In addition, the plates 2 and 3 are provided with orientation layers 10 and 11, which cover the electrodes 8 and 9, respectively. One can derive from the figures that the electrode which consist of for example $SnO_2$, $In_2O_3$ or $(SnO_2)_x \cdot (In_2O_3)_{1-x}$, will fill up the recesses 12 and 13 in the plates which carry them in such manner that the surface facing the layer of liquid crystal material is at the same height as the surface of the plate area surrounding them. In other words, the thickness of the electrodes 8 and 9 is the same as the depth of the recesses 12 and 13 in the plates 2 and 3, respectively. The plate recesses have a depth in a range of approximately 0.03 $\mu$m to about 0.15 $\mu$m so that the electrodes, which are considered thin electrodes or $\lambda/2$ electrodes, terminate flush with the remaining surface of the carrier plate and are non-reflective.

The carrier plates such as 2 and 3 of the display or cell 20 can be fabricated in an economical way in the following process. First, the carrier plate is coated with a continuous layer of negative lacquer. The lacquer is exposed and developed to form a mask, which exposes the surface of the carrier plate in those positions or locations in which the conductive layer is to be applied. The carrier plate is then deep etched with an HF-process or with a Freon plasma to a depth which corresponds to the desired thickness for the conductive layers forming the electrodes such as 8. Next, a conductive layer is applied to the entire plate, preferably by sputtering on or by vapor depositing so that layer is deposited in the recesses such as 12 and 13 as well as on the etching mask. Subsequently and after the application of the conductive layer to a thickness which is the same as the depth of the recesses, the remaining portion of the photo resist layer which forms the etching mask with the conductive layer disposed thereon is removed preferably with a plasma process. After removing the etching mask, the plate is then covered with a soft emersion layer, which then can obtain orienting microgroove structure by means of a friction technique. Subsequently, after forming the carrier plate, the carrier plates are assembled in an ordinary manner which is utilized to form an ordinary twisted liquid crystal cell.

The display 20' of FIG. 2 varies from display 20 of FIG. 1 in that the electrodes are not located in recesses on the carrier plate but are rather applied directly to the planar surface of the carrier plate and are framed by an additional insulating layer 14 and 15 of a material, for example silicon oxide. The insulating layer has precisely the same thickness as the layer forming the electrodes so that the surface formed by the electrodes and the insulating layer such as the electrodes 8 and the layer 14 is planar and flush. If the insulating material also coincides with the conductive material in its index of refraction, then the electrode independent of the thickness selected need not be de-reflected.

To produce the carrier plate utilized in the device 20', one first coats a surface of the carrier plate with the conductive layer. Then a positive photo resist is applied on the conductive layer, exposed and developed to produce an etching mask, which cover the conductive layer in those positions or in a pattern which corresponds to the pattern of the electrodes to be provided on the carrier plate. Then one etches the exposed portions of the conductive layer which are not covered by the etching mask. Subsequently, the plate receives an insulating layer, which is exactly as thick as the conductive layer. Then the etching or photo resist mark with the insulating layer disposed thereon is peeled off. Next, an orientation layer is created by means of oblique vapor depositing. After forming the carrier plates, they are assembled together with a frame in the usual manner which carrier plates are assembled to form a liquid crystal cell.

In the device 20', if the electrodes 8 or 9 are of a tin oxide base, the layer 14 or 15 may consist of a material selected from a group consisting of zirconium oxide and titanium oxide.

If the electrodes are surrounded by a special insulating layer, then one can employ cheap, alkali-containing glasses for the carrier plates without further processing because the liquid crystal substance does not come in contact with the plate.

The invention is not limited to the sample embodiments illustrated. Thus, in addition to cells in which the layer of material are twisted nematic, liquid crystal displays with different display principles, for example "inversed" twisted cells, displays of the dynamic scattering type or DAP displays also may utilize carrier plates constructed in the above mentioned manner. Apart from this, it is also noted that it is not always necessary to coat the electrodes with the additional orientation layers such as 10 or 11.

Although various minor modifications may be suggested by those versed in the art, it should be understood that we wish to embody within the scope of the patent warranted hereon, all such modifications as reasonably and properly come within the scope of our contribution to the art.

We claim:

1. A process for the manufacture of a liquid crystal cell wherein each of the carrier plates supports an electrode formed of a conductive coating received in a recess with the thickness of the electrode equal to the depth of the recess so that the electrode is flush with the adjacent insulating layer, said process comprising providing a carrier plate, coating a surface of the carrier plate with a photo resist, exposing and developing the photo resist to remove portions of the photo resist to form a mask which exposes portions of the surface of the carrier plate in a pattern of the electrodes to be applied thereon, deep etching the exposed portions of the surface of the carrier plate to form recesses of a given depth, subsequently applying a layer of electrically conductive material in each etched recess and on the mask to a thickness equal to the depth of the recesses, then removing the remaining mask with the conductive layer disposed thereon so that the conductive layer is disposed in each recess extends flush with the surface of the carrier plate, then applying an additional layer of insulating material on the conductive layer and surface of the carrier plate and subsequently rubbing the insulating material to provide an orientation layer.

2. A process for the manufacture of a liquid crystal cell wherein each of the carrier plates supports an electrode formed of a conductive coating received in a recess with the thickness of the electrode equal to the depth of the recess so that the electrode is flush with the adjacent insulating layer, said process comprising providing a carrier plate, coating a surface of the carrier plate with a photo resist, exposing and developing the photo resist to remove portions of the photo resist to form a mask which exposes portions of the surface of the carrier plate in a pattern of the electrodes to be applied thereon, deep etching the exposed portions of the surface of the carrier plate to form recesses of a given depth, subsequently applying a layer of electrically conductive material in each etched recess and on the mask to a thickness equal to the depth of the recesses, then removing the remaining mask with the conductive layer disposed thereon so that the conductive layer is disposed in each recess extends flush with the surface of the carrier plate, and then applying an orientation layer on the surface of the carrier plate and conductive layer by obliquely vapor depositing an additional insulative layer onto the carrier plate and the electrodes.

3. A process for manufacturing a liquid crystal cell which has a pair of carrier plates having facing surfaces provided with conductive layers forming electrodes and an insulating layer of material with the thickness of the insulating layer and the electrodes being substantially the same so that the surfaces are flush, said process comprising the steps of providing a carrier plate, coating a surface of each carrier plate with electrically conducting layer of material, coating the electrically conductive layer of material with a layer of photo resist, exposing and developing the photo resist to form a mask in the pattern of the electrodes so that the portions of the conductive layer adjacent the electrodes are free of the mask, removing the exposed portions of the conductive layer to expose portions of the surface of the carrier plate, subsequently applying an insulating layer on the mask and the exposed portions of the surface of the carrier plate, then removing the remaining portions of the mask including the insulating layer disposed thereon so that a surface of the carrier plate has a pattern of electrodes and an insulating layer each of the same depth, then applying an additional layer of insulating material on the insulating layer and electrodes and subsequently rubbing the additional insulating material to provide an orientation layer.

4. A process according to claim 3, wherein the step of applying a layer of conductive material applies a layer of tin oxide base and the step of applying the insulating layer applies a layer selected from a group consisting of zirconium oxide and titanium oxide.

5. A process for manufacturing a liquid crystal cell which has a pair of carrier plates having facing surfaces provided with conductive layers forming electrodes and an insulating layer of material with the thickness of the insulating layer and the electrodes being substantially the same so that the surfaces are flush, said process comprising the steps of providing a carrier plate, coating a surface of each carrier plate with electrically conducting layer of material, coating the electrically conductive layer of material with a layer of photo resist, exposing and developing the photo resist to form a mask in the pattern of the electrodes so that the portions of the conductive layer adjacent the electrodes are free of the mask, removing the exposed portions of the conductive layer to expose portions of the surface of the carrier plate, subsequently applying an insulating layer on the mask and the exposed portions of the surface of the carrier plate, then removing the remaining portions of the mask including the insulating layer disposed thereon so that a surface of the carrier plate has a pattern of electrodes and an insulating layer each of the same depth, and applying an orientation layer by obliquely vapor depositing an additional insulative layer onto the electrodes and the insulating layer.

6. A process according to claim 5, wherein the step of applying an orientation layer applies the orientation layer to cover each surface of the electrodes and the adjacent insulating material formed by the layer of insulating material.

7. A process according to claim 5, wherein the step of applying a layer of conductive material applies a layer of tin oxide base and the step of applying the insulating layer applies a layer selected from a group consisting of zirconium oxide and titanium oxide.

* * * * *